Nov. 30, 1965
J. P. JONES, JR
3,221,334
RECORDING SYSTEM
Filed March 23, 1961
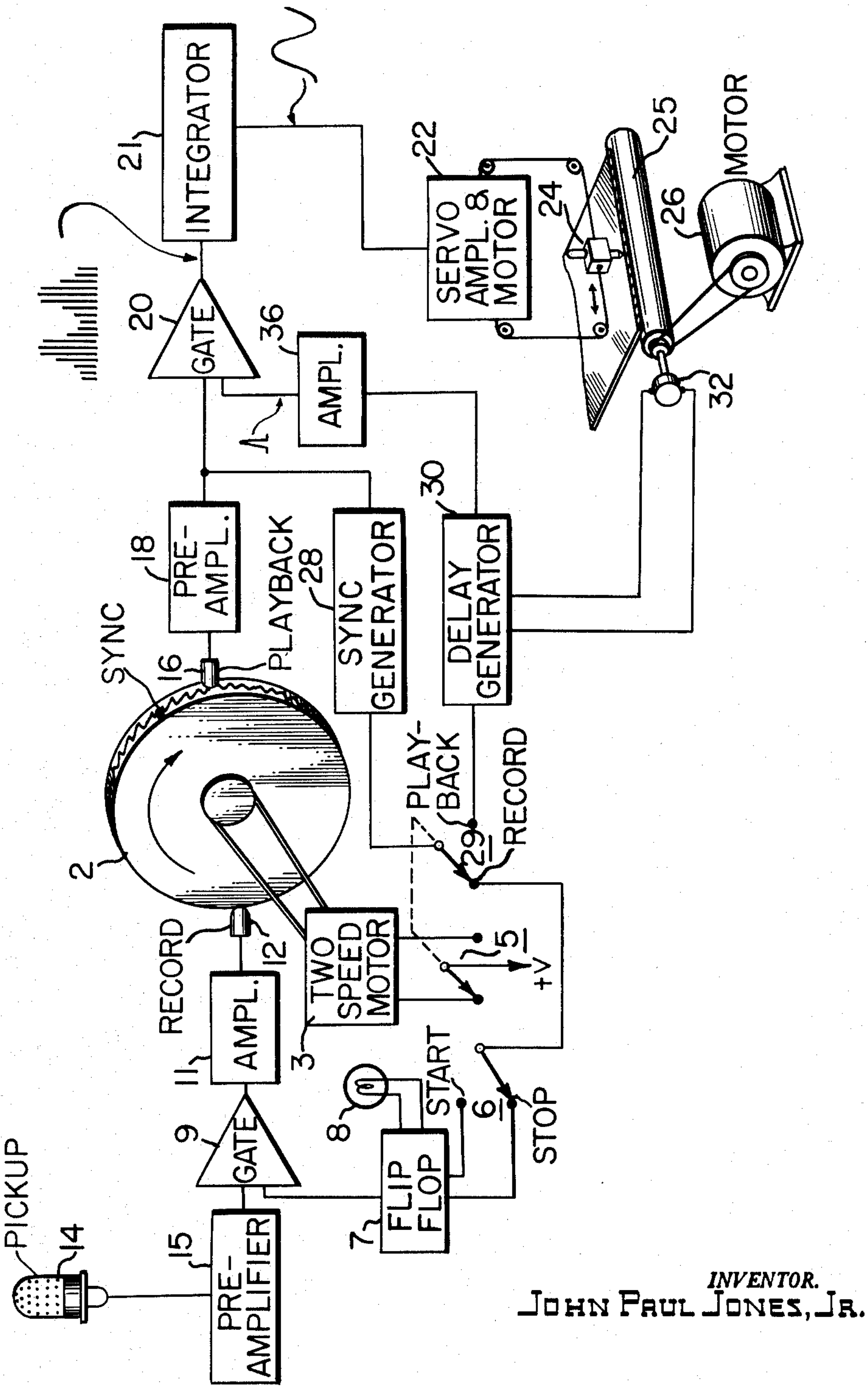
INVENTOR.
JOHN PAUL JONES, JR.

United States Patent Office 3,221,334
Patented Nov. 30, 1965

3,221,334
RECORDING SYSTEM

John Paul Jones, Jr., Wynewood, Pa., assignor to Navigation Computer Corporation, a corporation of Pennsylvania Filed Mar. 23, 1961, Ser. No. 97,864
7 Claims. (Cl. 346—33)

This invention relates to recording systems and in particular to systems useful for medical diagnosis and the permanent recording of medical clinical data.

Physicians require instruments that are capable of permanently recording data such as heartbeats for analysis and diagnosis. The usual medical recording instrument of the mechanical type has a limited upper frequency response and, for this reason, requires the use of inconveniently large amounts of recording paper to provide a very small amount of useful recorded information. Optical recording devices can be used to overcome the frequency limitations of mechanical devices. The optical systems are costly, complicated, delicate and require the use of a photographic developing process before a useful recording is available. These are serious shortcomings. There is no available instrument that combines the features of an acceptable high frequency response, ruggedness and simplicity of operation.

It is therefore an object of this invention to provide an improved recording system, particularly of the type that may be used for medical diagnostic and analysis purposes.

It is another object of this invention to provide an improved recording system having a high frequency response and which is rugged and simple to operate.

It is yet another object of this invention to provide an improved recording system of the magnetic type which provides an instant and permanent recording of information.

A recording system embodying the present invention includes information storage means such as a magnetic drum that rotates at a slow speed during the recording cycle of the system. During playback, the drum rotates at a high speed. Control circuitry, associated with the playback circuitry, changes the high frequency recorded signal to a low frequency signal which drives a low speed servo motor mechanism, which, in turn, drives a recording instrument for making a permanent recording of the original information.

The novel features that are considered characteristic of this invention are set forth with particularity in the appended claims. The invention itself, however, both as to its organization and method of operation, as well as additional advantages and objects thereof, will best be understood from the following description when read in connection with the accompanying drawing, in which the single figure is a schematic circuit diagram of a recording system embodying the present invention.

Referring now to the drawing, a recording system embodying the invention includes information storage means such as a magnetic drum 2, the outside perimeter of which is coated with a magnetic recording material or magnetic recording tape. The magnetic drum 2 is driven by a conventional two speed motor 3, the speed of which is varied by a means of a switch 5. The switch 5 is of the conventional type and includes a pair of terminals and a movable contact member which is connected to a source of operating potential (+V) for the motor. A second switch 6, which may be of the conventional push-button type has its terminals connected to the input of a conventional flip-flop circuit 7. The flip-flop circuit 7, which preferably is a transistor multivibrator, has two stable operating conditions. One of these is a stable state of conduction or "on" state where the other is a stable state of non-conduction or "off" state. A recording light 8 is connected to the flip-flop circuit and is illuminated in response to the conducting condition of the flip-flop 7 to provide a visual indication of the recording process. The output of the flip-flop circuit 7 is connected to a conventional gate circuit 9, which is also preferably of the transistor type.

The output of the gate circuit 9 is connected through an amplifier circuit 11 to the recording head 12 of the magnetic drum 2. The information which is to be recorded, which in the case of a medical recording system would be, for example, a heartbeat, is picked up by a transducer or pickup 14, such as a microphone. The information which is picked up by the transducer 14 is amplified by a preamplifier circuit 15 and applied to the input of the gate circuit 9.

The magnetic drum 2 also includes a playback head 16 which detects the recorded information on the perimeter of the drum. The output signal from the playback head 16 is applied to the input of a pre-amplifier circuit 18. The output circuit of the pre-amplifier 18 is connected to the input of a conventional gate circuit 20. The output of the gate circuit 20 is connected to the input of a conventional integrating network or circuit 21. The output circuit of this network is, in turn, connected to a servo amplifier and motor 22. The servo amplifier and motor 22 drives a recording instrument 24, which would preferably be a conventional ball point pen. In fact, one of the advantages of the invention, as will become apparent, is that a simple and usually available ball point pen can be used as the recording instrument. The ball point pen 24 is mounted to record information on paper that can be driven, for example, by a roller 25, which is rotated by a single speed motor 26.

The detected output signal from the magnetic drum 2, after amplification by the pre-amplifier 18, is also applied to a sync detector 28. The output circuit of the sync detector 28 is connected to the movable contact member of a record and playback switch 29, which is gang connected with the motor switch 5. The "playback" terminal of the switch 29 is connected to the input circuit of a delay generator 30. The "record" terminal of the switch 29 is connected to the movable contact of the push-button switch 6. A control voltage is applied to the delay generator 30 by means of a variable tracking potentiometer 32. The potentiometer 32 would normally include a resistance arm, one terminal of which would be grounded, and the other terminal of which would be connected to a source of positive potential. The voltage which is applied to the delay generator from the potentiometer would be varied by means of a sliding contact which varies the resistance across which the voltage from the source is dropped. Thus, the voltage which is applied to the delay generator 30 from the potentiometer varies in proportion to the displacement of the recording paper under the recording instrument 24. The system is completed by a connection from the output circuit of the delay generator 30 to an amplifier circuit 36, the output of which is connected to the gate 20.

In operation, the switch 5 would be in the position shown during the record cycle. The motor 3 operates at a slow speed for this switch position. Typically, the speed of the motor would be of a value to rotate the drum 2 at a speed of one inch per second. The switch 6 is placed in the start position during the record cycle. This would be accomplished by depressing a push-button to hold the switch contact in the start position in contact with the upper switch terminal. The drum 2 has a single sync pulse recorded on its perimeter. This recorded sync pulse passes under the playback head 16 to provide an output pulse, which is amplified by the pre-amplifier 18 and applied to the sync detector 28, which detects the presence of the sync pulse. The detected sync pulse is applied to the input of the flip-flop circuit 7 to trigger it into its stable state of current conduction to provide an output voltage pulse. The current conducting condition of the flip-flop 7 also turns on the recording light 8. At this time, the operator can release the push-button for the switch 6, returning the movable contact to the lower or "stop" position.

The output pulse from the flip-flop 7 is applied to the gate circuit 9. This pulse turns the gate 9 "on," permitting signals which are picked up by the transducer 14 and amplified by the pre-amplifier 15 to be translated to the amplifier 11. The amplified signals from the amplifier 11 are applied to the recording head 12 which records the information on the magnetic drum 2.

The recording process continues for one complete cycle of the drum 2. Once one cycle of the drum has occurred, the sync pulse is picked up by the playback head 16, amplified, detected, and applied to the flip-flop through the lower or stop terminal of the switch 6. This turns the flip-flop off, returning it to its other stable state of non-conduction. The gate circuit 9 is thus closed, preventing the translation of signals from the transducer 14 to the recording head 12. The record cycle can be repeated until a satisfactory recording is obtained.

To playback the information on the drum that was recorded during the recording cycle, the switch 29 is switched to the write position. The contact of the switch 5 thus contacts its second terminal, which switches the motor 3 so that it operates a its second or high speed. Typically, this speed would be such that the drum 2 would rotate at a speed of one hundred inches per second or one hundred times faster than its speed during the recording cycle.

At the same time, the motor 26 is turned on to move the recording paper under the recording instrument 24 by means of the roller 25. The movement of the recording paper is synchronized, with the sliding contact of the potentiometer 32. Thus, the control voltage which is applied to the delay generator 30 is proportional to the displacement of the recording paper under the recording pen 24. The control voltage, in turn, determines the time that sync pulses, derived from the drum once each revolution, are delayed by the delay generator 30. The output from the delay generator 30 is thus a strobe pulse which is delayed in time in proportion to the displacement of the recording paper. The delayed strobe pulses are amplified by the amplifier 36 and applied to the gate 20. The signal which is picked up by the playback head 16 is amplified by the pre-amplifier 18 and applied to the input of the gate 20. An output signal is derived from the gate 20 at each moment a strobe pulse is applied to it. Thus, a train of momentary output pulses is derived from the gate 20, which vary in amplitude in proportion to the amplitude of the signal which was recorded originally in the drum 2. These pulses are integrated by the integrator 21 which detects the envelope of the peak amplitude of the pulses to provide the envelope of the signals which were recorded originally at a low frequency. These low frequency signals are applied to the servo amplifier 22, which in turn drives the recording instrument 24.

The playback operation thus serves to change the relatively high frequency recorded signal into a low frequency signal which is capable of driving a low speed servo motor mechanism. The low speed servo motor mechanism drives, and is able to overcome, the inertia of the recording instrument at very low speeds. Thus, a rugged and common-place recording instrument, such as an ordinary ball point pen, can be used. In addition, the slow speed output permits the information to be recorded on a small strip of paper which can be filed easily for later reference. The recorded information is available instantly.

For medical use, the invention provides a reliable and convenient recording instrument that is rugged and compact. The system, moreover, is simple to operate and practically "fool proof" in operation.

What is claimed is:

1. A recording system comprising, in combination, cyclical information storage means, means for recording information having high frequency components on said information storage means at a first rate of speed, means for deriving recorded information from said information storage means at a second rate of speed, said second rate of speed exceeding said first rate of speed, means for deriving a sync pulse from said storage means once during each cycle thereof, a low speed recording instrument incapable of reproducing the high frequency components of the information directly, control means for delaying said sync pulse in proportion to the displacement of a recording medium for said recording instrument, means responsive to said delayed sync pulse to provide a gated signal from said means deriving information for each cycle which varies in amplitude in proportion to the high frequency components of information which is recorded on said information storage means, and means for coupling a train of the gated pulses for recording by said recording instrument.

2. A recording system comprising, in combination cyclically repeating information storage means, means for recording signal information having high frequency components on said information storage means at a first and slow rate of speed during one cycle thereof, means for deriving recorded information from said information storage means at a second and higher rate of speed, recording means movable at a relatively low rate of speed as compared with the higher rate of speed and inherently incapable of reproducing the high frequency components of recorded signal coupled with said means for deriving recorded information, control means processing said derived recorded information to sample pulses during each recording cycle referenced from a fixed recording position in the cycle, and variable delay means coupled with said recording means and said control means for synchronizing the position of sample pulses with respect to said fixed recording position to correspond with movement of the recording means, whereby the low speed recording means reproduces signals from a train of momentary output pulses representing the signal originally recorded on the storage means.

3. A recording system comprising the combination of a magnetic recording drum having a single sync pulse recorded on its perimeter, means for rotating said drum at a relatively slow speed during the record cycle of said system, circuit means responsive to said sync pulse during said record cycle to provide the recording of informatiin on the perimeter of said drum during one revolution thereof, playback means for deriving recorded information from said drum and providing electrical signals at a relatively low frequency and in proportion to said recorded information, a recording instrument for recording information on a recording medium, servo motor means connected to drive said recording instrument, means for changing the rotation of said drum to a relatively high speed during the playback cycle of said system, means for delaying said sync pulse in proportion to the displacement of said recording medium during each revolution of said drum during said playback cycle, and means responsive to said sync pulse during said playback cycle to provide low frequency output signals in response to said relatively high frequency electrical signals for driving said servo motor means at a slow speed.

4. A recording system comprising, in combination, a magnetic recording drum having a single sync pulse recorded on the perimeter thereof, signal transducer means, a recording head for said drum, means including a gate circuit coupling said transducer means with said recording head, means for rotating said drum at a relatively slow speed during the record cycle of said system, circuit means responsive to said sync pulse during said record cycle to open said gate circuit to permit the recording of information from said signal transducer means on the perimeter of said drum during one revolution thereof, a playback head for deriving recorded information from said drum and providing electrical signals at a relatively high frequency and in proportion to said recorded information, a recording instrument, servo motor means connected to drive said recording instrument, means including a second gate circuit coupling said playback head with said servo motor means, a recording medium for said recording instrument, means for changing the rotation of said drum to a relatively high speed during the playback cycle of said system, variable signal delay means connected to operate in synchronism with the displacement of said recording medium to delay said sync pulse during each revolution of said drum during said playback cycle, means for applying said sync pulse to said delay means, and means for applying delayed sync pulses to said second gate circuit during said playback cycle to provide low frequency output signals in response to said relatively high frequency electrical signals for driving said servo motor means at a slow speed.

5. A recording system comprising the combination of a magnetic recording drum having a single sync pulse recorded on its perimeter, signal transducer means, a magnetic recording head for said drum, means including a gate circuit coupling said signal transducer means with said recording head, means for rotating said drum at a relatively slow speed during the record cycle of said system, a magnetic playback head for said drum, logic circuit means coupled between said magnetic record head and said gate circuit and responsive to a sync pulse to open on the perimeter of said drum during one revolution thereof and to close said gate circuit at the end of said one
of and to close said gate circuit at the end of said one
revolution, a recording instrument, servo motor means connected to drive said recording instrument, means including a second gate circuit coupling said playback head with said servo motor means, means for changing the rotation of said drum to a relatively high speed during the playback cycle of said system, a recording medium for said recording instrument, a motor connected to displace said recording medium under said recording instrument during said playback cycle, delay generator means connected to operate in synchronism with said motor to delay said sync pulse during each revolution of said drum during said playback cycle, means including a portion of said logic circuit means coupling said playback head with said delay generator means, means coupling said delay generator means with said second gate circuit to apply sync pulses thereto for providing low frequency output signals therefrom in response to the relatively high frequency electrical signals derived by said playback head for driving said servo motor means at a slow speed.

6. A recording system as defined in claim 5 wherein an integrator circuit couples said second gate circuit to said servo motor means.

7. A recording system as defined in claim 5 wherein said logic circuit means includes a sync detector and a flip-flop circuit.

References Cited by the Examiner

UNITED STATES PATENTS

| | | | |
|---|---|---|---|
| 2,435,879 | 2/1948 | Eilenberger ------- | 340—174.11 |
| 3,045,207 | 7/1962 | Peterson -------- | 340—174.1 X |

LEO SMILOW, *Primary Examiner.*

I. L. SRAGOW, *Examiner.*